July 13, 1971  J. E. RODRIGUEZ  3,592,765
AQUARIUM FILTER

Filed Aug. 4, 1969  2 Sheets-Sheet 1

INVENTOR.
JUAN E. RODRIGUEZ

INVENTOR.
JUAN E. RODRIGUEZ

United States Patent Office 3,592,765
Patented July 13, 1971

3,592,765
AQUARIUM FILTER
Juan E. Rodriguez, 37 Crest Road,
New Hyde Park, N.Y. 11040
Filed Aug. 4, 1969, Ser. No. 847,365
Int. Cl. E04h 3/20
U.S. Cl. 210—169                              9 Claims

ABSTRACT OF THE DISCLOSURE

This invention is directed to an aquarium filter that includes a plural section outer shell in which the sections are readily separable, a submersible electric motor and pump positioned in the shell base, and a readily removable filter cartridge unit supported by the pump. Adaptors are provided for vacuum cleaning the interior of an associated aquarium tank, or for emptying the tank or for discharging the filtered water as a fountain into the tank. The water may be aerated during its passage through the unit.

---

This invention relates generally to new and useful improvements in filters for liquids and particularly seeks to provide a novel filter for domestic, municipal and commerical aquaria.

Up to the present time, particularly with the sizes of aquaria normally found in homes, it has been customary to separately aerate, heat and circulate the water without filtration and to change the water whenever it becomes dirty or slimy. Under such conditions the fish and other marine life in the tank are subjected to erratic environmental changes that may be harmful and certainly must be net-handled much more frequently than would be the case if the water were continuously filtered and kept clean, aerated and at the proper temperature.

A filter constructed in accordance with this invention enables an aquarium to be operated over a prolonged period of time without changing the water.

Therefore, an object of this invention is to provide an aquarium filter that filters, aerates and heats the water in the tank.

Another object of this invention is to provide a filter of the character stated in which the tank water is circulated by an electric submersible pump, the intake of which draws water through a replaceable filter cartridge.

Another object of this invention is to provide a filter of the character stated in which heat from the motor casing of the pump heats the tank water witin an acceptable range of temperatures.

Another object of this invention is to provide a filter of the character stated in which aerating air is drawn into the pump intake through an inlet tube extending into the pump intake through an inlet tube extending into the atmosphere above the water level in the tank and controlled in volume by a plug valve fitted adjacent the upper end of the tube.

Another object of this invention is to provide a filter of the character stated in which the pump and filter cartridge unit are contained within a four section hollow casing, the sections of which are readily separable for access to the interior and for adapting the unit for use as a vacuum cleaner or for use in pumping water out of the tank.

A further object of this invention is to provide a filter of the character stated that includes an adaptor to enable the unit to be used as a vacuum cleaner for the interior of the tank.

A further object of this invention is to provide a filter of the character stated that includes an adaptor for connection to the pump discharge to enable the unit to be used to pump water from the tank.

A further object of this invention is to provide a filter of the character stated that may be shipped in kit form for ready assembly at the point of use.

A further object of this invention is to provide a filter of the character stated that is simple in design, rugged in construction and economical to manufacture.

With these and other objects, the nature of which will be apparent, the invention will be more fully understood by reference to the drawings, the accompanying detailed description and the appended claims.

Figure 1:
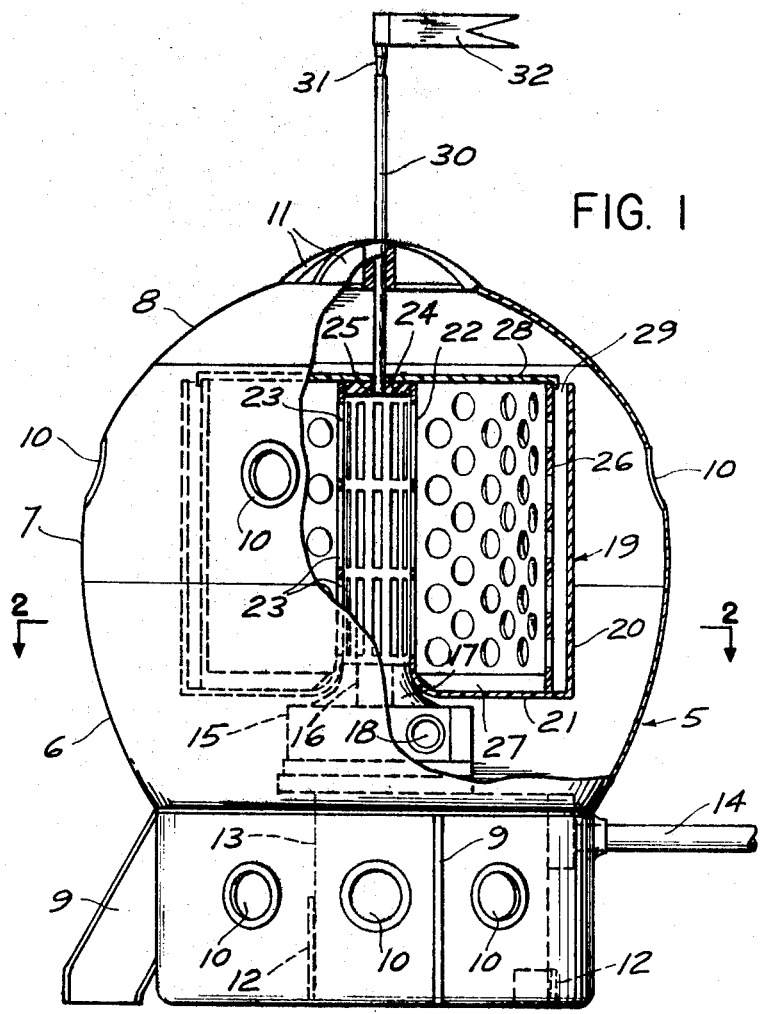
FIG. 1 is a front elevation, partly in section, of an aquarium filter constructed in accordance with this invention.
Figure 2:
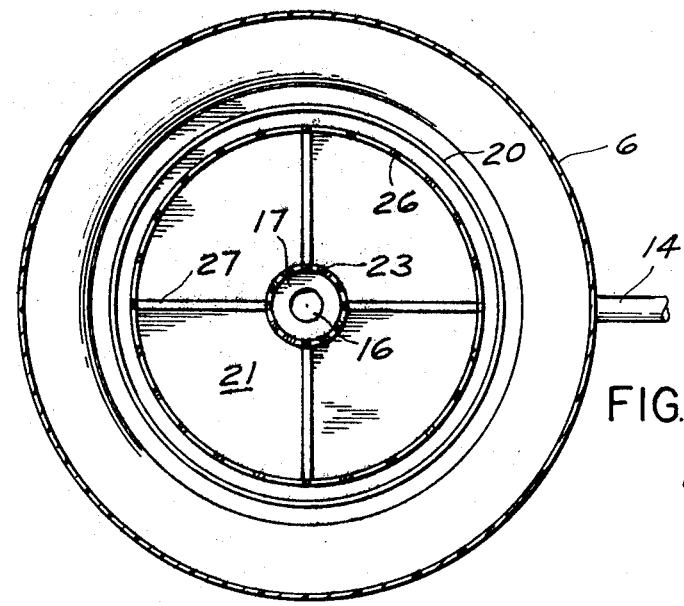
FIG. 2 is a horizontal section taken along line 2—2 of FIG. 1.

Referring to the drawings in detail the invention, as illustrated, is embodied in an aquarium filter unit that includes a multi-sectioned hollow outer shell generally indicated 5 and having a lower section 6 that extends upwardly for approximately one half of the height of the unit, an intermediate or middle section 7 that interlocks with the lower section 6, and a top section 8 that interlocks with the middle section 7. The lower section 6 is also provided with a plurality of radially extending legs 9 which prevent the unit from tilting when set on the bottom of an aquarium tank.

The lower and middle shell sections 6 and 7 are provided with a plurality of water inlet ports 10, and the central portion of the top section 8 is similarly provided with a plurality of radially disposed wedge-shaped water inlet slots 11.

A pair of spaced brackets 12, 12 are affixed to the bottom of the lower shell section 6 and retain a submersible electric motor 13 that receives its power from a waterproof cable 14 that may be plugged into any convenient electrical outlet.

A rotary pump 15 is operably connected to the motor 13 at the top thereof and includes a central vertical inlet 16, formed in a stud 17, and a tangential discharge 18 that extends through the lower shell section 6.

A cartridge type filter unit, generally indicated 19, is supported by the stud 17 and includes an outer shell 20 having a bottom 21 that terminates inwardly into an axial vertical sleeve 22 provided with a multiplicity of relatively narrow longitudinal slots 23 and closed at its upper end by a disc plug 24 having an axial bore 25 for receiving the lower end of an air tube as will be hereinafter more fully described. A cylindrical strainer 26 which may be formed from wire mesh or perforated metal or plastic, is positioned within the filter shell 20 and is retained in spaced coaxial relation therewith by a plurality of spacing elements 27 at the bottom of the strainer and extend radially inwardly into contact with the sleeve 22. A replaceable filter cartridge (not shown) is inserted in the void between the sleeve 22 and the strainer 26 to increase the efficiency of the filter.

The top of the strainer 26 is covered by a circular closure plate 28 leaving an open annular slot 29 between the top of the strainer and the filter shell 20 for admission of water into the void therebetween and thence through the strainer, the filter cartridge and the slotted sleeve 22 from which the then filtered water is drawn into the intake 16 of the pump 15.

At least a portion of the water that is drawn through the filter 19 enters the unit through the lower inlet ports 10 and thus circulates around the motor 13 and pump 15 to cool same. Conversely, the heat from the motor and pump warms the circulating water and keep its temperature within an acceptable range for the well being of the marine life in the aquarium.

Figure 5:
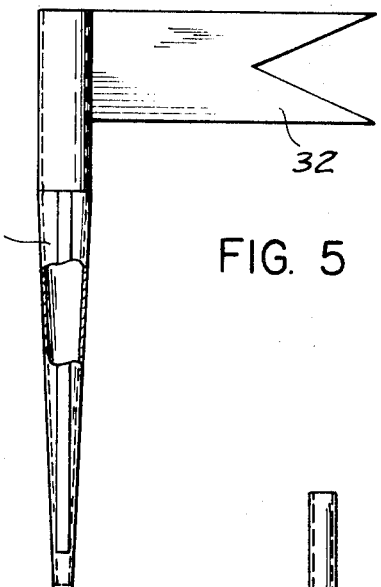
FIG. 5 is an enlarged side elevation, partly in section, of a tapered valve plug for controlling admission of air to the unit.

This filter unit also aerates the water through the use of an air intake tube 30 that extends vertically through the top section 8 of the outer shell with its lower end frictionally retained within the bore 25 of the disc plug 24 at the top of the slotted sleeve 22. A tapered valve plug 31 (see FIG. 5) is inserted in the top of the air intake tube 30 and may be readily adjusted to control the volume of air passing through the tube. If desired, a decorative flag 32 or other device may be attached to the top of the valve plug 31.

Figure 3:
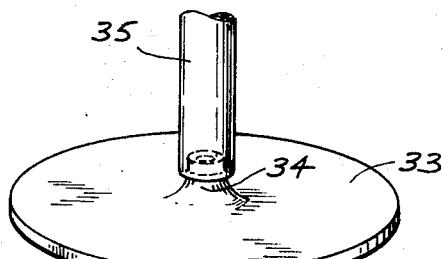
FIG. 3 is a perspective view of the filter top cover plate to be used for vacuum cleaning purposes.
Figure 4:
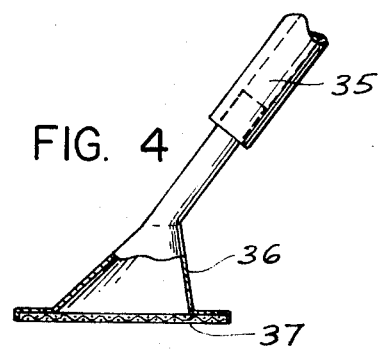
FIG. 4 is an enlarged side elevation, partly in section, of a suction nozzle used for vacuum cleaning purposes.

The filter unit also may be used to vacuum clean the aquarium tank. To this end, the top shell section 8 is removed and the closure plate 28 is replaced by a larger closure plate 33 (see FIG. 3) that covers the entire top of the filter shell 20 and is provided with an upstanding nipple 34 for connection with one end of a flexible plastic hose 35, the other end of which is connected to a suction nozzle 36 having its mouth closed by a wire mesh or other suitable screen 37. After vacuuming the closure plate 33 is removed and the plate 28 and the top shell section 8 are replaced to resume normal operation of the unit.

Figure 7:
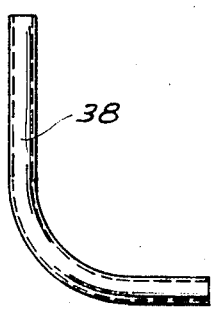
FIG. 7 is a side elevation of a fountain tube adaptor for connection to the pump discharge.

Water from the pump 15 may also be discharged as a fountain simply by attaching a right angled tubular adaptor 38 (see FIG. 7) to the pump discharge 18 with the vertical leg of the adaptor extending above the surface of the water in the aquarium tank.

Figure 6:
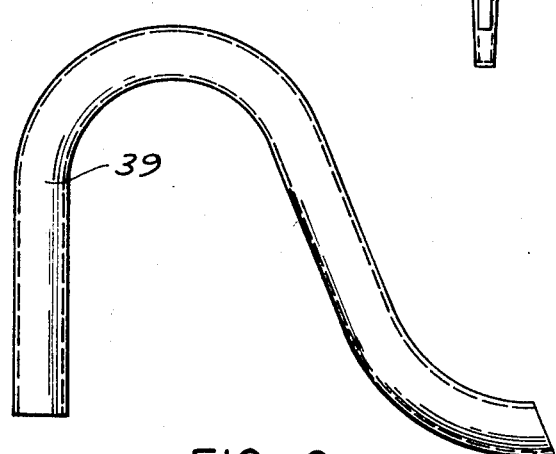
FIG. 6 is a side elevation of a tank discharge adapter for connection to the pump intake.

The unit also may be used to pump water out of the aquarium tank by removing the top and intermediate shell sections 8 and 7 together with the cartridge filter assembly 19, after which a water discharge adaptor 39 (see FIG. 6) is fitted onto the pump intake stud 17 with its free end resting on the gravel or sand in the bottom of the aquarium tank. When emptying the tank in this manner a discharge hose (not shown) is connected to the pump discharge 18 and led to any convenient drain.

It will be understood that the various parts of this filter unit are readily assembled and disassembled without the use of tools so that its several functions may be selectively put into operation. Thus, the sections 6, 7 and 8 of the main shell 5 may be interlocked either by lap or bayonet joints; the filter assembly 19 is simply frictionally supported by the intake stud 17 of the pump; the closure plates 28 and 33 are frictionally fitted to their respective filter elements; and the fountain and discharge adaptors 38 and 39 are similarly frictionally fitted to the intake stud 17.

It is of course to be understood that variations in arrangements and proportions of parts may be made within the scope of the appended claims.

I claim:

1. An aquarium filter including a plural section main outer shell, the sections of said outer shell being readily separable along predetermined planes of junction; a submersible electric motor and pump positioned in the base of said outer shell, said pump having a vertically extending axial water intake stud and a substantially horizontal tangential discharge extending through said outer shell; and a filter assembly supported by the intake stud of said pump, said filter assembly including an open top imperforate outer shell, a central slotted sleeve fitted over the intake stud of said pump, and a cylindrical strainer fitted within said outer filter shell in spaced relation thereto; said main outer shell being provided with a plurality of inlet ports to permit water to enter and pass through said filter assembly.

2. The aquarium filter of claim 1 additionally including a filter cartridge interposed between said central slotted sleeve and said cylindrical strainer.

3. The aquarium filter of claim 1 additionally including a cover plate fitted over the top of said cylindrical strainer whereby to force water to flow into the void between said strainer and said imperforate outer shell and through said strainer.

4. The aquarium filter of claim 1 additionally including a cover plate fitted over the top of said imperforate outer shell and having an axial nipple whereby to force water to flow into said central slotted sleeve.

5. The aquarium filter of claim 1 additionally including an aerating tube extending from the top of said plural section outer shell into open communication with the interior of said central slotted sleeve.

6. The aquarium filter of claim 5 additionally including a valve operably associated with said aerating tube for controlling the volume of air permitted to pass therethrough.

7. The aquarium filter of claim 4 additionally including a suction hose attached to the nipple of said cover plate.

8. The aquarium filter of claim 1 in which said filter assembly is replaced by a suction adaptor for emptying water from an associated aquarium tank.

9. The aquarium filter of claim 1 additionally including an adaptor attached to the discharge of said pump for directing the flow of water therefrom upwardly as a fountain above the water level in an association aquarium tank.

References Cited

UNITED STATES PATENTS 2,210,977  8/1940  Hollander _____ 210—416X
2,335,756  11/1943  Haldeman _____ 210—169(UX)

REUBEN FRIEDMAN, Primary Examiner

T. A. GRANGER, Assistant Examiner